(12) United States Patent
Höhling et al.

(10) Patent No.: US 8,759,497 B2
(45) Date of Patent: Jun. 24, 2014

(54) METHOD FOR PRODUCING PROTEIN HYDROLYSATES

(75) Inventors: Axel Höhling, Berlin (DE); Maria Schultze, Friedersdorf (DE); Sigmar Mothes, Berlin (DE)

(73) Assignee: Animox GmbH, Berlin (DE)

( * ) Notice: Subject to any disclaimer, the term of this patent is extended or adjusted under 35 U.S.C. 154(b) by 1561 days.

(21) Appl. No.: 11/793,822

(22) PCT Filed: Dec. 23, 2005

(86) PCT No.: PCT/EP2005/014183
§ 371 (c)(1),
(2), (4) Date: Jun. 22, 2007

(87) PCT Pub. No.: WO2006/069803
PCT Pub. Date: Jul. 6, 2006

(65) Prior Publication Data
US 2008/0009611 A1     Jan. 10, 2008

(30) Foreign Application Priority Data
Dec. 23, 2004   (DE) .......................... 10 2004 063 258

(51) Int. Cl.
| A61K 38/01 | (2006.01) |
| C07K 1/00 | (2006.01) |
| C07K 14/00 | (2006.01) |
| C07K 16/00 | (2006.01) |
| C07K 17/00 | (2006.01) |

(52) U.S. Cl.
USPC ......................................................... 530/407

(58) Field of Classification Search
None
See application file for complete search history.

(56) References Cited

U.S. PATENT DOCUMENTS

| 6,221,423 B1 | 4/2001 | Cho et al. |
| 6,365,047 B1 | 4/2002 | Bischof et al. |
| 2002/0129631 A1 * | 9/2002 | Carelli et al. ..................... 71/15 |

FOREIGN PATENT DOCUMENTS

| CN | 1098260 A | 2/1995 |
| CN | 1283397 A | 2/2001 |
| DE | 2756739 A | 6/1979 |
| DE | 10117321 A1 | 4/2002 |
| DE | 10113537 A1 | 9/2002 |
| EP | 0653165 B1 | 5/1995 |
| EP | 1021958 A | 7/2000 |
| EP | 1193223 A1 | 4/2002 |
| EP | 1312611 A1 | 5/2003 |
| EP | 1406508 A1 | 4/2004 |
| ES | 2162462 | 12/2001 |
| FR | 2751177 A | 1/1998 |
| GB | 846682 | 8/1960 |
| RU | 2132142 C1 | 6/1999 |
| WO | WO 02/49449 | 6/2002 |

OTHER PUBLICATIONS

Google translation of EP1021958. Translated using <http://translate.google.com>. Translation obtained Mar. 10, 2009.*
EP 1193223. Publication date Jul. 1, 2004. Google English Translation.*
Prusiner, Stanley B., "Molecular Biology and Pathogenesis of Prion Diseases", Trends in Biochemical Sciences, vol. 21, pp. 482-487, Dec. 1996.
International Search Report for International Application No. PCT/EP2005/014183 mailed on May 24, 2006.

* cited by examiner

*Primary Examiner* — Marcela M Cordero Garcia
*Assistant Examiner* — Sergio Coffa
(74) *Attorney, Agent, or Firm* — Pearl Cohen Zedek Latzer Baratz LLP

(57) ABSTRACT

The aim of the invention is to provide a method for producing protein hydrolysates that have defined molecular weight limits without carrying out enzymatic or pH-adjusting process steps. For this purpose, the method for producing protein hydrolysates from proteinaceous plant and animal materials is characterized by splitting the materials up in an aqueous medium under a targeted pressure build-up in a reaction chamber, the temperature and reaction being controlled by a characteristic curve of the system, and separating the suspension after splitting into a sediment containing the insoluble components of the starting material, and an aqueous supernatant in which the cleavage products of the materials are dissolved.

9 Claims, 4 Drawing Sheets

METHOD FOR PRODUCING PROTEIN HYDROLYSATES

CROSS-REFERENCE TO RELATED APPLICATIONS

This application is a National Phase Application of PCT International Application No. PCT/EP2005/014183, International Filing Date Dec. 23, 2005, claiming priority of German Patent Application No. 10 2004 063 258.8, filed Dec. 23, 2004.

BACKGROUND OF THE INVENTION

The invention relates to a method for producing hydrolysates from protein-containing plant and animal raw materials.

Protein-containing plant and animal natural and waste products can be prepared in a variety of ways for material application. As a rule it is accordingly necessary to split the macromolecules (proteins) both into amino acids and also peptides, comprising several amino acids.

Protein-hydrolysis is known which leads to an amino acid mixture through addition of acids or bases with temperature effect. After the protein is split the solution must be neutralised, though the important and economically interesting amino acid tryptophan is destroyed during acid hydrolysis.

The protein splitting can also be carried out enzymatically using proteases of microbial origin. At the same time both endopeptidases, which break up peptide chains into different fragments according to their splitting specificity, and exopeptidases, which provide amino acids, are used.

Methods and processes of pH value-dependent and enzymatic protein hydrolysis are described inter alia in GB 846682, RU 2132142 and U.S. Pat. No. 6,221,423.

Macromolecules of complex materials of animal and plant waste, such as carbohydrates, fats and proteins, can also be split under the effect of raised pressure and raised temperature. The resulting fragments are made available to microbially supported energetic application, e.g. methane development.

In U.S. Pat. No. 6,365,047, ES 2162462T and DE 10117321 the prior art of pressure temperature hydrolysis is illustrated with respect to the procedural solutions.

DE 10113537 describes the pressure-temperature treatment for animal meal. In the basic medium a pressure of 2.5 bar and a temperature of 150° C. at least 15 min have an effect on the aqueous animal meal suspension, predominantly in terms of inactivation of the BSE exciter of infected animal meal and flesh pulp.

According to EP 1406508 BSE-free animal meal is split by total hydrolysis of the protein of the animal meal into amino acids with addition of acids/lyes and if required subsequent processing with proteases. Neutralisation must follow the splitting process.

All these methods are, however, not suitable for making hydrolysates in defined molecular weight limits.

SUMMARY OF THE INVENTION

The object of the present invention is to provide a process by which it is possible to manufacture protein hydrolysates with defined molecular weight limits without pH value-setting and without enzymatic procedural steps.

The method for manufacturing protein hydrolysates of protein-containing plant and animal raw materials is characterised in that the raw materials in the aqueous medium controlled by a temperature and reaction effect by a system characteristic and under focussed pressure build-up in a reaction space are split, and in that the suspension following the splitting process is separated into a sediment, containing the insoluble constituents of the starting material, and an aqueous projection, in which the split products of the raw materials are dissolved, whereby the split products are protein hydrolysates such as peptides and amino acids.

Advantageous further developments are specified in the independent claims.

In a configuration of the invention the inventive process is characterised in that the splitting is preferably carried out in a temperature range from 140° C. to 250° C., at a pressure of 5 bar to 220 bar and in reaction times up to 120 min. Molecules with different defined molecular weights in the magnitude of 10-50 kDa are obtained hereby as split products.

In a further configuration the inventive process is characterised in that splitting of the protein molecules is preferably carried out in a temperature range between 180° C. and 220° C. and at a pressure between 50 and 75 bar and in reaction times from 25 to 40 min. The advantageous result in this case is protein hydrolysates having a molecular weight<20 kDa.

In a further configuration splitting takes place continuously in tube reactors (FIG. 1) or according to the batch principle, at the same time avoiding by-products.

In a further configuration the splitting process is controlled by analysis of the molecule size of the peptides in the aqueous projection.

In a further configuration of the process the splitting process is controlled by ongoing determinations (analyses) of the molecule size of the peptides in the aqueous projection.

In a further configuration it is provided that prior to entering the reactor the raw material is processed into a pourable suspension with water via a colloid mill with specific split size and specific duration, preferably 15 to 60 min. By way of advantage, this results in pre-development of the molecules.

A further configuration provides that the temperature range of the splitting is selected between 140° C. and 250° C. and a targeted pressure between 1.1 and 10 times the vapour pressure of the respective temperature is set. This advantageously ensures a consistent liquid phase state within the system. The permanent liquid state of the suspension ensures its continuous and undisturbed supply.

In a further configuration of the invention splitting is conducted at a temperature of >150° C. and a pressure >45 bar. Here a split product profile with amino acids and peptides <20 kDa is obtained.

A further configuration provides that as raw materials plant and animal materials, such as wheat meal or animal meal, preferably pre-treated by cleaning or respectively extraction steps are utilised for protein splitting.

A further configuration provides that the raw material is sifted to set a specific grain size, preferably <2 mm.

In a further configuration concentrations of 5 to 40% aqueous mash are processed directly, or following sedimentation of the undissolved constituents only the projection is processed.

A further configuration provides that the suspension is circulated by means of a pump. In particular, a booster pump is suited to circulate the suspension. The process pump is attached suitably for the suspension.

In a further configuration of the invention it is provided that the solids are removed from the water-soluble constituents after annealing of the reaction product.

The soluble split products can be used in liquid or dried form for chemical processes. They are further suited to be used as culture media for cultivating microorganisms.

As per the invention, the splitting pattern of the proteins is fixed in a reactor by the parameters of temperature, pressure and reaction time. At the same time the pressure in particular is consistently above the inherent steam pressure of water, so that adhering to a single-phase system in the reaction sequence is continuously assured. It was surprisingly found that a defined peptide amino acid mixture of protein-containing raw materials can be obtained by the controlled pressure temperature effect and the reaction time also without pH change and without addition of enzyme. By strictly adhering to preset system characteristics (FIG. 2) the inventive process produces a material suitable as basic material for biotechnological and chemical syntheses and processes.

The process is controlled by analysis of the molecule sizes of the peptides and microbial applicability of the split products. Unwanted auxiliary reactions can be excluded by using protective gas.

The present invention provides a process for material application of animal meal, which is variably adaptable to the required product-related processing conditions.

The process underlying the invention is suitable for simultaneously ensuring destruction of the BSE exciter, if the processing is configured according to the invention such that the amino acid peptide mixture has molecular weights of the individual constituents under 20 kDa. It is known that the molecular weight of the BSE exciter is 27 kDa to 30 kDa (Prusiner, St. B. (1996) *TIBS* 21, 482-487: *Molecular biology and pathogenesis of prion diseases*).

The process can be performed both in continuously running tube reactors and also in batch reactors. The major advantage of tube reactors is that the reactor volume can be adapted at any time to changing qualities of the starting material.

BRIEF DESCRIPTION OF THE DRAWINGS

The invention will now be explained by way of example by means of the figures, in which.

DETAILED DESCRIPTION OF THE INVENTION

Figure 1:
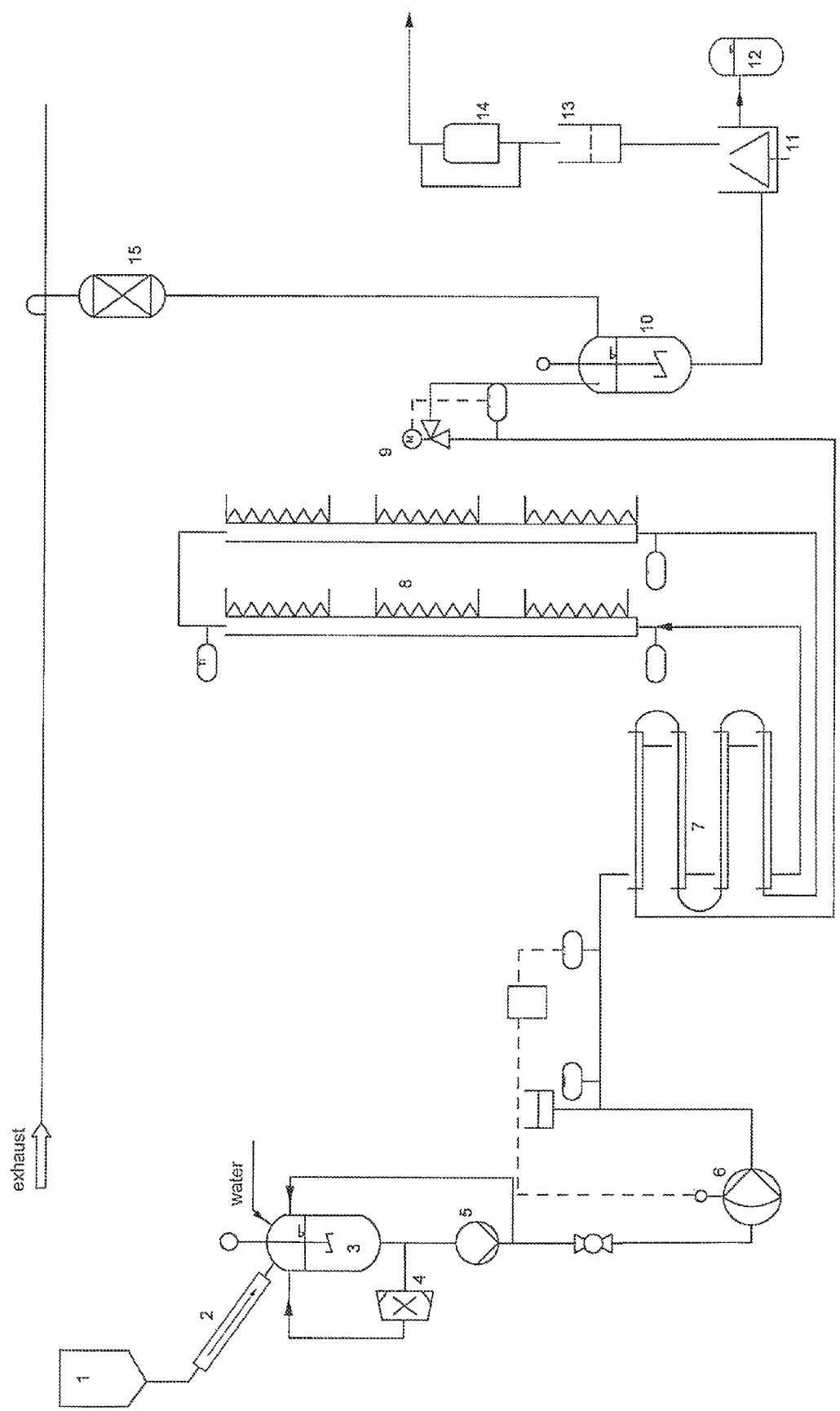
FIG. 1 shows a schematic illustration of the procedural sequence.

FIG. 1 illustrates the sequence of the inventive process by way of example.

Before the raw materials enter a silo 1 the raw material is sifted to remove foreign constituents and the overflow. The raw material is then discharged from the silo 1 by a discharger 2 known per se and mixed in an impeller mixer 3 with water and then comminuted and suspended by a colloid mill 4 with defined splitting width. The suspension is homogenised through comminution in the colloid mill 4, and mechanical digestion of the biomass results in improved hydrothermal splitting of the proteins. To prevent sedimenting and depositing, the suspension is stirred in the impeller mixer 3.

After the suspension process a commercial booster pump 5 suctions the suspension and circulates it back to the impeller mixer 3. The container is further agitated.

Supply to a process pump 6 is made from the pressure line of the booster pump 5. A pressure of 5-220 bar, preferably 40-100 bar, is set by the process pump 6 on the equipment side. The suspension first enters a heat exchanger 7, where it is heated in countercurrent by the split product leaving the reactor 8. At the same time the suspension is heated from ca. 20° C. to 120° C.-140° C. The split product cools down from ca. 140° C.-250° C. to 30° C.-60° C.

After the heat exchanger 7 the suspension is conveyed to the reactor 8. The reaction space comprises several tube reactors connected in series. The reactor 8 is heated from the outside and the suspension is heated to temperatures of 140° C.-250° C. After entering the reactor 8 the proteins from the raw material are split into peptides and amino acids under the influence of pressure and temperature.

Static mixers arranged in the heat exchanger 7 and/or before the reactor 8 and/or in the reactor 8 enable the material flow to be thoroughly mixed.

After the split product has left the reactor 8 and cools in the heat exchanger 7, it is released by means of a pressure-reduction valve 9 to surrounding conditions. This release can be done in a single and/or double step, however preferably single. The gases accumulating in a annealing container 10 are forwarded to an external exhaust gas washer 15 to separate out any aromas.

The hydrolysate collected in the annealing container 10 is then further processed by a centrifuge/a decanter 11 such that the sediment present is separated out. The sediment is collected in a storage tank 12. The resulting soluble phase (projection) is further separated by filtration 13, preferably ultrafiltration. The resulting filtrate can be dried in drying 14 and used as is or in liquid form.

Figure 2:
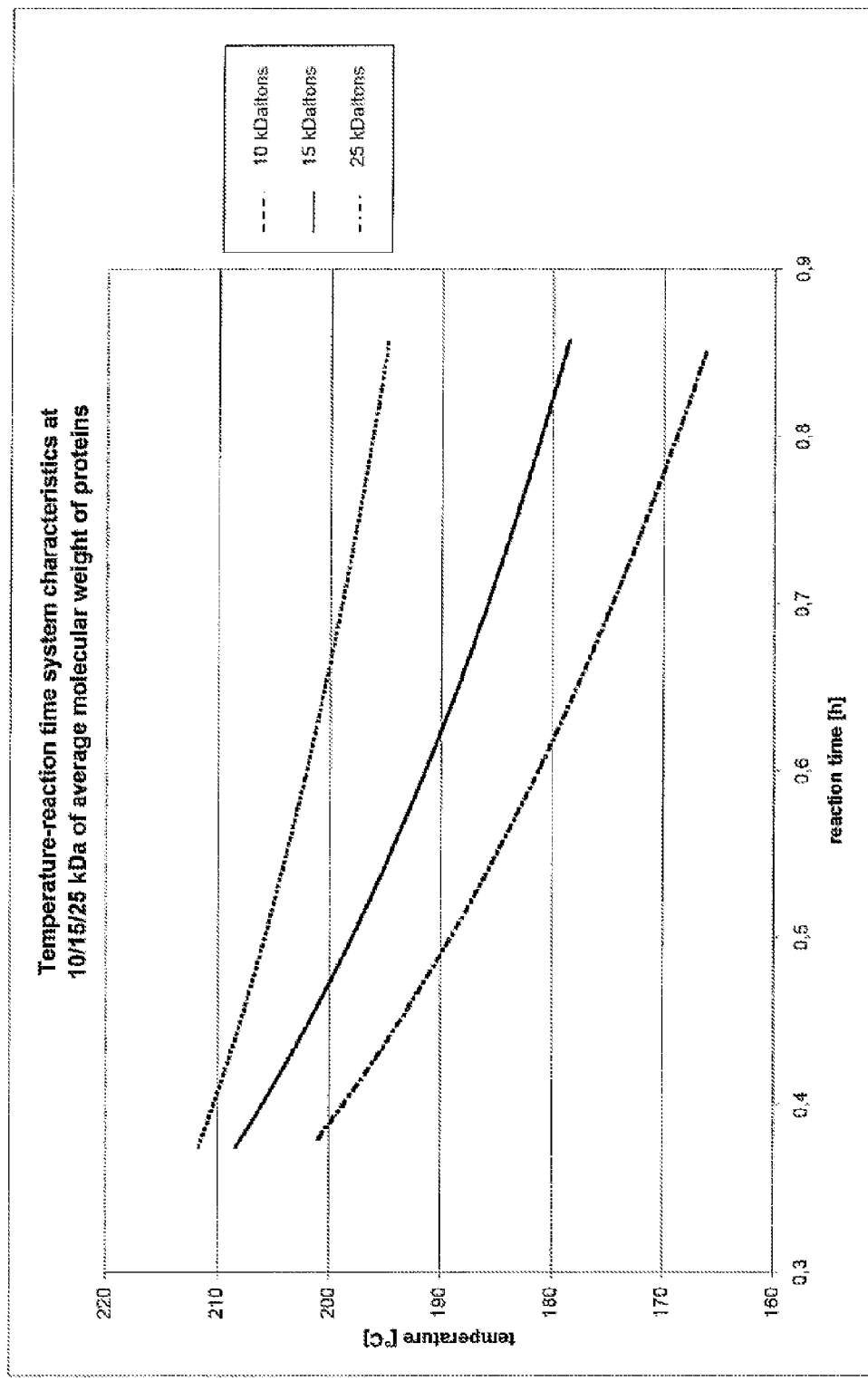
FIG. 2 shows an exemplary illustration of system characteristics (temperature reaction time) in the continuous reactor.

FIG. 2 shows temperature reaction time characteristics with the process being carried out continuously. A defined average molecular weight of the proteins is achieved by adhering to a specific profile of the parameters of reaction temperature and reaction time at a preset reaction pressure with the temperature pressure hydrolysis method. Equipment parameters and dry substance content in the suspension are considered as additional influence variables. A clear influence of reaction time and temperature is evident. To achieve similar products the temperature must be raised with minimal reaction time, or respectively longer reaction times must be selected at minimal temperature. In carrying out the process according to the upper line molecules with a molecular weight of 10 kDa result on average. In carrying out the process according to the middle line molecules with a molecular weight of 15 kDa result on average and in carrying out the process according to the lower line on average those of 25 kDa.

Figure 3:
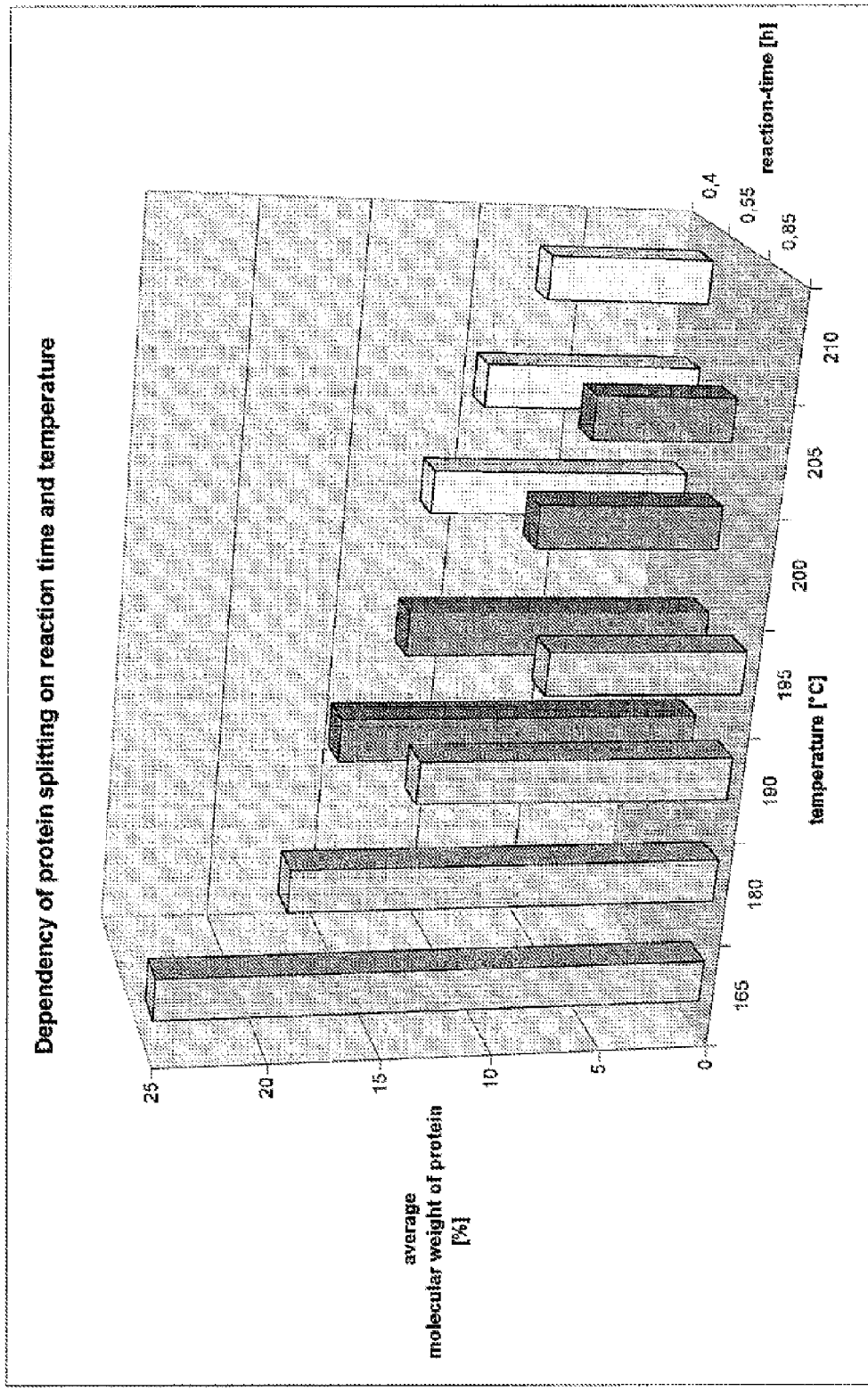
FIG. 3 shows an exemplary illustration of the dependence of the inventive process on reaction time and temperature.

FIG. 3 shows the dependence of the inventive process (protein splitting) on reaction time and splitting temperature. The following dependences are evident:

1. With rising temperature the average peptide molecular weight drops. More protein is thus split and smaller protein fragments (peptides and amino acids) are obtained.
2. With increasing reaction time the average molecular weight drops at the same temperature. The effect of a longer reaction time is therefore further splitting of the proteins into smaller fragments.
3. The data had been taken up equipment-specific at certain pressure settings. The effect of changes to these influence variables is deviating splitting outcomes of high-pressure hydrolysis.

Figure 4:
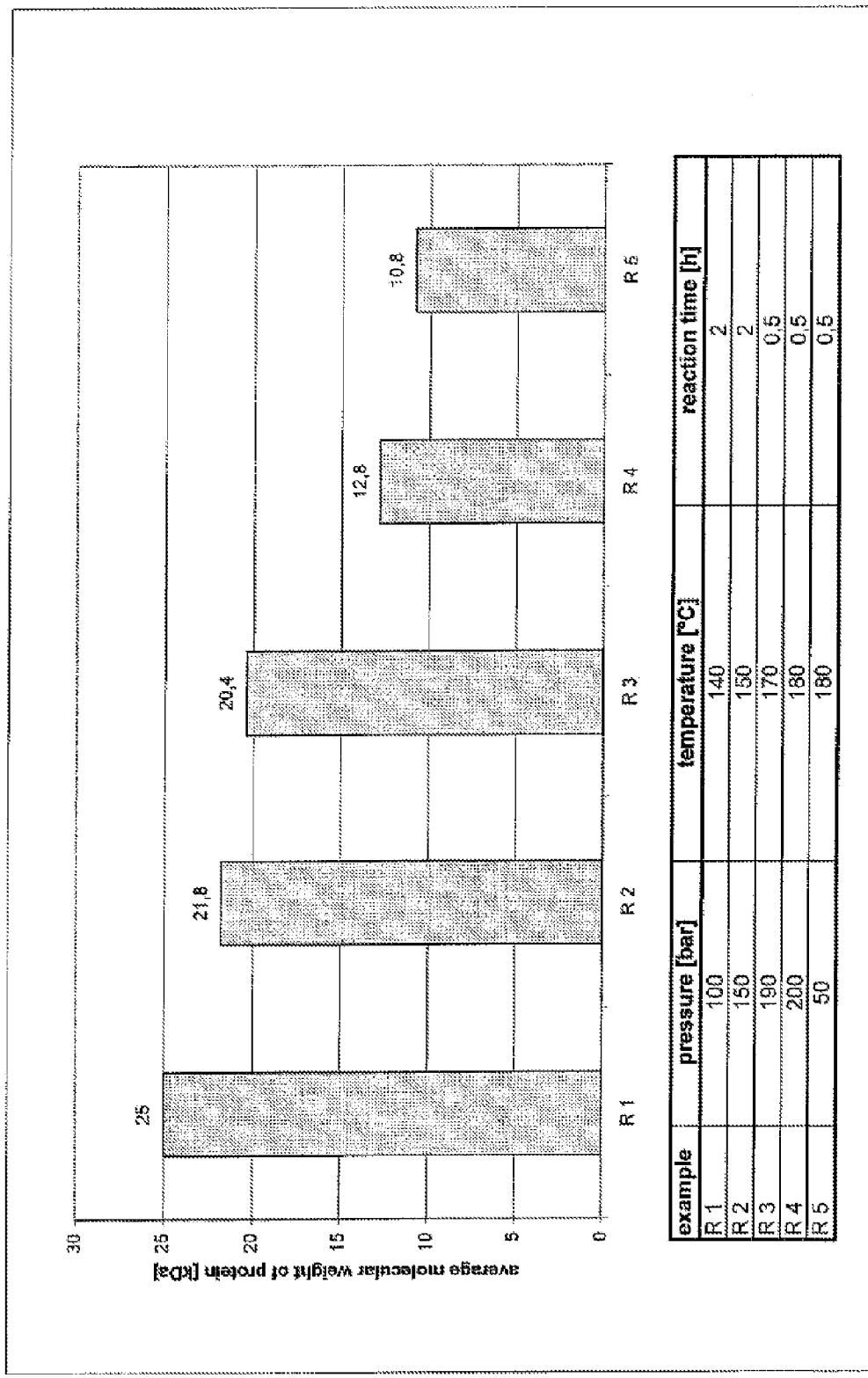
FIG. 4 shows an illustration of the examples R1 to R5.

FIG. 4 illustrates the examples R1, R2, R3, R4 and R5. Various procedural parameters (pressure, temperature, reaction time) are shown. It is proven by way of example that different average molecular weights are obtained from specific adjusting of pressure, temperature and reaction time in the equipment.

The invention will now be explained in greater detail by means of further examples.

Example 1

Animal meal made by processing plants for abattoir by-products is used as raw product. The animal meal is sifted to remove foreign constituents and overflow (>2 mm). A 30% animal meal water suspension is made in an impeller mixer 3 with stirring using a colloid mill 4. The process pump 6 conveys the suspension from the prestorage tank and compacts it to a pressure of >50 bar (U). The temperature in the reactor 8 is >200° C., the reaction time 30 min and the throughput 100 kg/h. After splitting the hydrolysate suspension is released to the surrounding pressure in a single step from the process pressure.

The collected hydrolysate is then separated from the sediment by separation and filtration Next, ultrafiltration 13 with a cut-off of 20 kDa is performed. The filtrate is dried preferably in a spray dryer 14. At 300° C. incoming air temperature and 95° C. exhaust air temperature a dry, pourable powder is obtained.

The yield of dry powder is 35% relative to the dry substance of the starting material. The proteinogenic compounds (peptides, amino acids) are at 89% of the dry substance of the product. Gel chromatography of the product shows that the average molecular weight of the sample is 7 kDa.

Example 2

Animal meal of Category II made by processing plants for abattoir by-products is used as raw product. A mash is made of 70 g animal meal in 350 ml water. This mash is placed in a batch reactor. A temperature of 200° C. is set with stirring. A pressure of 100 bar is built up under nitrogen atmosphere. The reaction time is 120 min.

The sample is separated in the centrifuge 20 min at 3.000 g. The insoluble constituents (sediment) are separated out and the projection is used as reaction product for further analysis. The product has a yield of 58% relative to the dry substance of the starting material. The proteinogenic compounds are 81% of the dry substance of the product. Gel chromatography of the product shows that 100% of the sample has a molecular weight<20 kDa hat.

Example 3

Animal meal of Category III made by processing plants for abattoir by-products is used as raw product. A mash is made of 70 g animal meal in 350 ml water. This mash is placed in a batch reactor. A temperature of 140° C. is set with stirring. A pressure of 100 bar is built up under nitrogen atmosphere. The reaction time is 120 min.

The sample is separated in the centrifuge 20 min at 3.000 g. The insoluble constituents (sediment) are separated out and the projection used for further analysis as reaction product. The product has a yield of 40% relative to the dry substance of the starting material. The proportion of proteinogenic substances (peptides/amino acids) of the product is 84% of the dry substance of the split product. Gel chromatography of the product shows that 56.2% of the sample has a molecular weight<20 kDa.

Example 4

Wheat meal is used as raw product. A mash is made of 87.5 g wheat meal in 350 ml water. This mash is placed in a batch reactor. A temperature of 180° C. is set with stirring. A pressure of 50 bar is built up under nitrogen atmosphere. The reaction time is 30 min.

The sample is separated in the centrifuge 20 min at 3.000 g. The insoluble constituents (sediment) are separated out and the projection is filtered as reaction product with a 0.45 μm filter and used for further analysis. The product has a yield of 79.5% relative to the dry substance of the starting material. The proportion of proteinogenic compounds is 6% of the dry substance of the split product. Gel chromatography of the product shows that 99.5% of the sample has a molecular weight<20 kDa.

The above examples are accompanied analytically and controlled by the following methods:

Determining the Dry Substance for Determining the Product Yield

The dry weight includes the dissolved undissolved contents of a sample, remaining after drying at 103° C. Drying takes place until a constant weight is reached. The weight is related to the volume used for evaluation.

For determination of the dry weight the standard method according to DIN 38409-H 1-1 is employed. The dry weight is determined both by 20 ml projection and the sediment of 80 ml of split animal meal suspension.

Determining the Proteinogenic Compounds

Inorganically and organically bound nitrogen is oxidised to nitrate in alkaline medium by digestion with peroxodisulphate. The nitrate ions react in sulphuric acid and phosphoric acid solution with 2.6-dimethyl phenol into nitrophenol. Similar processing takes place using DIN EN ISO 11905-1 with a cell test (Dr. Lange, LCK 338). The quantity of proteinogenic compounds (peptides, amino acids) can be calculated from the total nitrogen content following removal of inorganic nitrogen fractions.

Gel Chromatography

Gel chromatography is a method in which molecules are separated in accordance with their size by means of porous gel material. Larger molecules are first eluted, then the smaller ones. It is possible to determine the molecule size by comparison on the basis of a suitable standard with defined molecule sizes. Gel chromatography was performed on Pharmacia equipment with a column (diameter: 1.6 cm, length: 30 cm, column volume: 60.3 ml). The proteins and peptides are detected at 280 nm. Column material Sephadex G-100 (separation area of 4-150 kDa) is used as stationary phase. PBS buffer is used as mobile phase. A gel chromatography standard by Biorad is used to determine the molecule sizes as marker substance.

Determining the Microorganism Growth

The microorganism growth is determined with the sample as nutrient substrate for checking the microbial applicability of the protein hydrolysates. A single colony is inoculated in a shaker basket with nutrient solution by a microorganism culture on culture agar and cultivated under corresponding conditions for 18 h. 100 ml of medium in a 500 ml shaker basket are used as main culture. The individual media are each inoculated with 1% of the pre-culture. These principal cultures are cultivated at corresponding temperature and aeration (shaker). The course of the growth curve is taken up by determination of the turbidity in the photometer and by determination of the living germination index in hourly time and then evaluated.

Determining the Germination Index by Turbidity Measuring

The determination of the germination index by turbidity measuring in the photometer is a method for indirectly determining the germination index of a microorganism suspension. In measuring a sample in the photometer visible light of a specific wavelength (600 nm) is partially absorbed and partially dispersed and can be read off as optical density (OD) on the photometer scale. The optical density increases proportionally to the germination index. A minimum germination index of $5 \times 10^6$ KBE/ml is required for measuring. Since measuring the OD is linear proportional to the cell count only up to ca. 0.3, the sample must be diluted at a higher OD.

Determining the Living Germination Index by the Spatula Method

With the living germination index determination those cells capable of forming a colony are determined. The result is given in "colony-forming units" (KBE). A series of dilutions up to the expected cell count (e.g. $10^8$ cells/ml) is made in dilutions by a factor of 1:10 of the sample and the last three dilutions are coated in the spatula method. The plates are bred for 24 h and the number of colonies is counted and calculated to KBE/ml.

LEGEND

1 Silo
2 Discharger
3 Impeller mixer
4 Colloidal mill
5 Booster pump
6 Process pump
7 Heat exchanger
8 Reactor
9 Pressure-reduction valve
10 Annealing container
11 Centrifuge/Decanter
12 Storage tank
13 Filtration
14 Drying
15 Waste gas washer

The invention claimed is:

1. A method for manufacturing hydrolysates from wheat meal or animal meal, the method comprising:
processing the wheat meal or animal meal to a pourable suspension with water (mash) having concentrations of 5 to 40% meal,
splitting of protein molecules within the mash by hydrolysis in an aqueous medium, wherein said step of splitting occurs in a reactor in a temperature range of 180° C. to 220° C., at a pressure of 50 bar to 75 bar, and within a reaction time of from 25 to 40 minutes, wherein said step of splitting occurs without a pH value adjusting step,
separating the suspension having the split protein molecules into a sediment, which contains the insoluble constituents of the wheat meal or animal meal, and an aqueous supernatant, in which the split protein molecules of the wheat meal or animal meal are dissolved, and
separating the split protein molecules from the aqueous supernatant, such that the split protein molecules have defined molecular weights of less than 20 kDa.

2. The method as claimed in claim 1, wherein splitting is carried out in tube reactors continuously or according to the batch principle, at the same time avoiding by-products.

3. The method as claimed in claim 1, wherein the splitting process is controlled by ongoing determinations of the size of the split protein molecules.

4. The method as claimed in claim 1, wherein before entering a reactor the wheat meal or animal meal is processed to a pourable suspension with water (mash) by a colloid mill with specific splitting size and specific duration.

5. The method as claimed in claim 1, wherein a targeted pressure is set between 1.1 and 10 times the steam pressure of the respective temperature.

6. The method as claimed in claim 1, wherein said wheat meal or animal meal is pre-treated by cleaning or extraction steps.

7. The method as claimed in claim 1, wherein the wheat meal or animal meal is sifted to set a specific particle size of <2 mm.

8. The method as claimed in claim 1, wherein the step of processing the wheat meal or animal meal further comprises circulating the pourable suspension (mash).

9. The method as claimed in claim 1, wherein said step of separating the suspension is performed after the suspension having the split protein molecules is released from said pressure.

* * * * *